D. REDMON.
BORING BRACE.
APPLICATION FILED JAN. 25, 1912.
1,029,028.
Patented June 11, 1912.
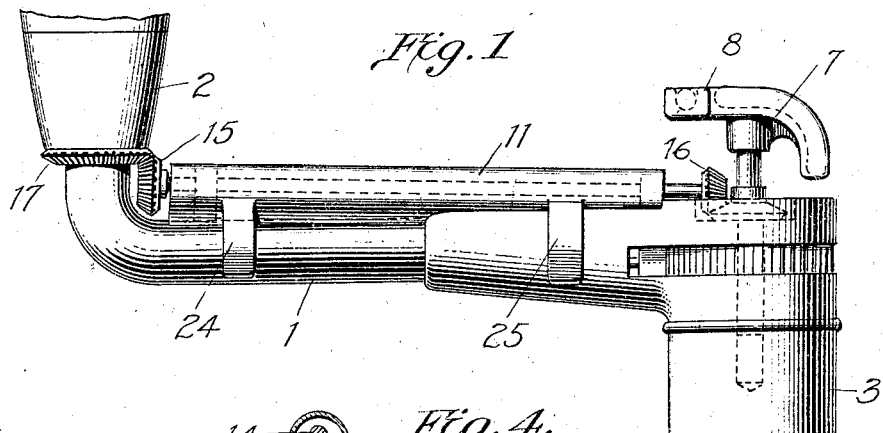
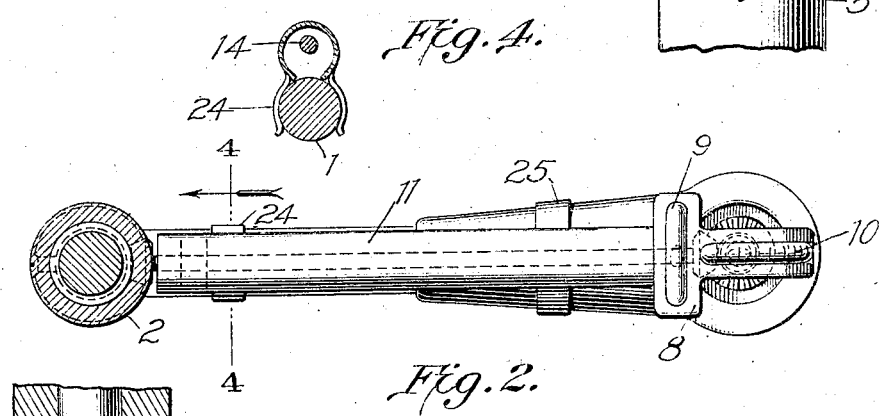
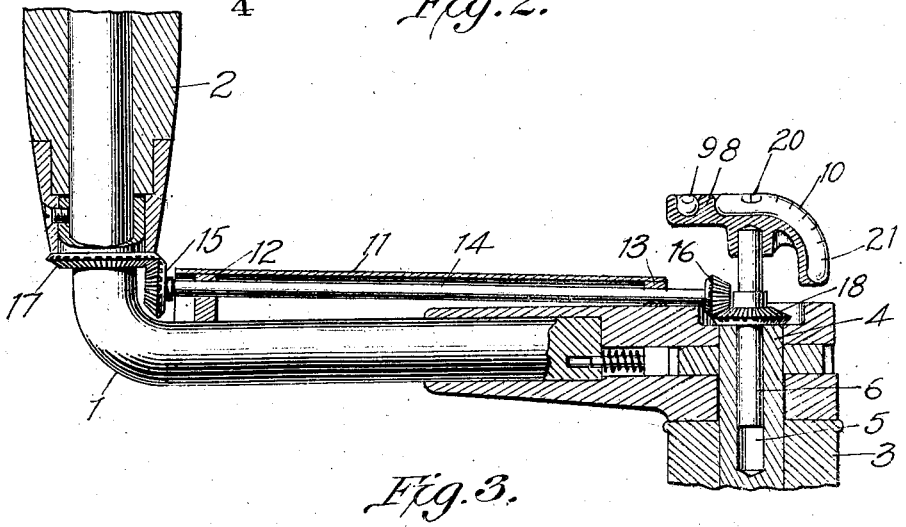
WITNESSES
INVENTOR
Dillard Redmon
Attorney

UNITED STATES PATENT OFFICE.

DILLARD REDMON, OF WASHINGTON, DISTRICT OF COLUMBIA.

BORING-BRACE.

1,029,028.

Specification of Letters Patent.

Patented June 11, 1912.

Application filed January 25, 1912. Serial No. 673,333.

*To all whom it may concern:*

Be it known that I, DILLARD REDMON, a citizen of the United States, residing at Washington, in the District of Columbia, have invented a new and useful Boring-Brace, of which the following is a specification.

This invention relates to boring braces and has particular reference to that variety of brace which has an offset or eccentric bend or sweep provided with a hand grip for imparting circular motion to the brace and to the boring tool used therewith.

The object of the invention is to provide means whereby the brace may be used to bore holes having perfectly vertical or horizontal axes or to bore holes at any desired angle to the horizontal or vertical.

I have illustrated my invention by means of the accompanying drawing which forms part of the specification, and in which, Figure 1 is an exterior side view. Fig. 2 is a plan view. Fig. 3 is a vertical section, and Fig. 4 is a section on line 4—4 of Fig. 2.

Referring to the drawing, 1 is a bent brace frame which carries on its offset portion the revolving hand grip 2, on its upper portion the ordinary form of thrust head (not shown) and on its lower portion the bit chuck 3 with the ordinary form of ratchet connection thereto. The upper end of the chuck spindle 4 is formed with a bore 5 in axial alinement with the chuck. Inserted in the bore 5 is a spindle 6 carrying on its upper end a leveling device 7, which consists of a carrying portion 8 in which are inserted spirit level glasses 9 and 10.

The lower horizontal portion of the brace frame is fitted with a shaft housing 11 provided with journals 12 and 13 at either end which carry the shaft 14. This shaft is provided at either end with bevel pinions 15 and 16, which mesh respectively with bevel gears 17 and 18 carried by the hand grip 2 and spindle 6. The ratio between the two sets of gears 15 and 17 and 16 and 18 is the same, from which, as a consequence, the spindle 6 will have the same absence of revolution on the chuck axis as does the hand grip 2 when the brace is used. By thus causing the leveling device to have such relative motion to the chuck that it will be at rest in respect to the eye of the operator, the level glasses may be kept at all times under clear observation by the operator, so that he may detect at once any variation from the particular angle at which he desires the hole to be bored.

For vertical boring the level glasses 9 and 10 being at right angles to each other afford means for instant detection at any variation from the vertical in either direction. For horizontal boring, the bubble in glass 10 takes its position at the point 21 instead of at the point 20 as in the vertical. For boring holes at different angles between horizontal and vertical, it is only necessary to incline the brace until the bubble in level glass 10 coincides with the desired graduations thereon between positions 20 and 21.

The housing 11 is secured to the lower horizontal portion of the brace frame 1 by means of spring clips 24 and 25 which grip the brace frame in a manner to hold the spindle 14 in correct alinement and at the same time admit of ready removal or adjustment of the entire housing, spindle and the gears by the grasp of the hand alone. In like manner the spindle 6 with its gear 18 and leveling device on its upper end is readily removed or replaced without the use of tools. When the parts are thus removed the boring brace differs from the ordinary form in nothing beyond the possession of the gear 17 on the hand grip 2 and the axial bore 5 in the upper end of the chuck head. In this way the boring brace may be used in the same manner as any other without being encumbered or complicated by the addition of complex or ungainly parts, being ready, however, at all times to be equipped with the leveling device and gear connection by the simple manual operation of thrusting the housing 11 and the spindle 6 into their respective positions.

The advantage of a boring brace which in ordinary use differs in no essential from such as are commonly used, but which can be converted immediately and with facility into a boring brace which can be used for the accurate boring in vertical and horizontal directions or at any desired angle, will be sufficiently obvious without further elaboration than my description as set forth.

It will also be obvious that while I have described only one form of my invention the same may be embodied in various apparatus involving a similar principle or mode of operation, all of which are apparent in this invention and included within the meaning of the appended claims.

What I claim is:

1. In a boring brace having a brace frame, a revoluble hand grip thereon and a bit chuck, the combination of a spindle in axial alinement with the chuck, a leveling device mounted on said spindle and gear connections between the spindle and said hand grip.

2. In a boring brace having a brace frame, a revoluble hand grip thereon and a bit chuck, the combination of a spindle in axial alinement with the chuck, a leveling device carried by said spindle and gear connections between the spindle and said hand grip, said gear connections comprising gears mounted on said hand grip and said spindle, bevel pinions meshing with each of said gears and a shaft connecting said pinions and revolving therewith.

3. In a boring brace having a brace frame, a revoluble hand grip thereon and a bit chuck, the combination of a spindle in axial alinement with the chuck, a leveling device mounted on said spindle, and gear connections between the spindle and said hand grip, said gear connections being arranged in a manner to neutralize rotation of said spindle.

DILLARD REDMON.

Witnesses:
E. M. COLFORD,
SPENCER HEATH.